US010007258B2

(12) United States Patent
Subramanya et al.

(10) Patent No.: US 10,007,258 B2
(45) Date of Patent: Jun. 26, 2018

(54) COMMUNICATIONS DEVICE WITH ADAPTIVE SCANNER FOR PROCESS CONTROL

(71) Applicant: Honeywell International Inc., Morristown, NJ (US)

(72) Inventors: Srikanth Subramanya, Karnataka (IN); Ard Van Schie, Honselersdijk (NL); Frank Van Bekkum, Bergschenhoek (NL); Venkatachal Gunderao Musigeri, Karnataka (IN); Andre Petersen, Waardenburg (NL)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 14/822,987

(22) Filed: Aug. 11, 2015

(65) Prior Publication Data

US 2017/0045882 A1 Feb. 16, 2017

(51) Int. Cl.
| | | |
|---|---|---|
| *G05B 21/02* | (2006.01) | |
| *G06F 15/177* | (2006.01) | |
| *H04W 4/00* | (2018.01) | |
| *G05B 19/418* | (2006.01) | |
| *G05B 19/00* | (2006.01) | |

(52) U.S. Cl.
CPC ....... *G05B 19/41855* (2013.01); *G05B 19/00* (2013.01); *G05B 2219/42263* (2013.01); *Y02P 90/02* (2015.11)

(58) Field of Classification Search
CPC .................................................. G05B 21/02

USPC .......................................................... 700/74
See application file for complete search history.

(56) References Cited

U.S. PATENT DOCUMENTS

| 5,907,491 A | 5/1999 | Canada et al. |
| 6,360,097 B1* | 3/2002 | Smith ................... H04W 48/16 340/7.42 |
| 9,288,758 B2* | 3/2016 | Jeong ................ H04W 52/0225 |
| 9,319,968 B2* | 4/2016 | Montemurro ......... H04W 48/16 |
| 9,413,607 B2* | 8/2016 | Lee ..................... H04L 12/2823 |

(Continued)

FOREIGN PATENT DOCUMENTS

| JP | 2003186531 A | 7/2003 |
| JP | 2006187316 A | 7/2006 |

(Continued)

*Primary Examiner* — Suresh Suryawanshi
(74) *Attorney, Agent, or Firm* — Jetter & Associates, P.A.

(57) ABSTRACT

A method of process control within a plant includes providing a first and second field device associated with processing equipment sensing a first and second process parameter respectively. The field devices are communicably coupled to a host computer by a communications path including a shared field communications channel portion (shared communications channel) that terminates at a communications device which includes a processor and memory that implements an adaptive scan period determination algorithm (adaptive scanner) which determines a first scan period for the first field device and a second scan period for the second field device each based on a parameter relevant to a data type of the process parameter or communications used. The host computer monitors operations in the plant using sampled data provided by the communications device including data based on the first and second process parameter at their respective scan periods.

14 Claims, 3 Drawing Sheets

(56) References Cited

U.S. PATENT DOCUMENTS

2007/0165656 A1     7/2007   Dobrowski et al.
2015/0135117 A1*   5/2015   Rajappa ............. G05B 19/4183
                                                                                             715/771

FOREIGN PATENT DOCUMENTS

KR          101343042 B1    1/2014
KR       20140076013 A    6/2014

* cited by examiner

▨ NORMAL LEVEL SCANS FOR TANKS 2 TO 4 (NOT MOVING)
☐ T1 TO T4 -> TEMPERATURE SCANS FOR THE TANKS 1 TO 4 ( TEMPERATURES ARE SCANNED SLOWER THAN LEVELS
▧ FASTER LEVEL SCAN (SHORTER SCAN PERIOD) FOR TANK 1 (MOVEMENT DETECTED)

COMMUNICATIONS DEVICE WITH ADAPTIVE SCANNER FOR PROCESS CONTROL

FIELD

Disclosed embodiments relate to process control for industrial plants, and more particularly to communications between the field devices associated with the processing equipment and a host computer through a communications path including a shared bandwidth limited communications channel.

BACKGROUND

In process control for industrial plants, there are sensors for sensing physical measurements for the process being run (e.g., pressure, temperature, level, or fluid flow) and instruments for performing monitoring and/or control output actions (e.g., control valves, actuators, drive units or tank sensors) for the processing units in the plant. These instruments are generally referred to as "field devices" or "field instruments" (hereafter "field devices"), which may be located in areas that are either manned or unmanned. These field devices are associated with the processing equipment (e.g. tanks, pipelines, boilers) which is part of the process control. For example, the tank gauging systems typically involve tank sensors measuring the product inventory relevant properties within the tanks. Tank gauging systems are widely used in application areas involving handling, shipping and storing of products, as well as in the chemical process industry.

In an industrial process control system, a communications device including a transceiver is used for scanning the field devices at a regular interval of time to generate measurement data such as product level, temperature, pressure, density data, and a communicably connected host computer performs process monitoring and/or for process control. The communications device comprises a processor with Inputs/Outputs (I/Os) functioning as a bridge (an IO device). A typical local polling system uses a clock to provide a control signal to the CPU of the communications device at predetermined intervals. Upon receiving the clock signal, the CPU initiates a signal for the communications device to begin polling each field device at a predetermined regular (constant) interval of time.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize scan rate problems arise for process control in industrial plants (plants) when using a conventional shared communications channel for at least a portion of the communications link between field devices and communications device when the shared communication channel has limited channel bandwidth and the scanning of each field device is performed at a common fixed interval of time (scan period). Specifically, a fixed scan period may not be appropriate for effective process control during a variety of plant control application scenarios. For example, during tank loading/unloading or when there are leaks the product level in the tank can change quickly, when measurement data (e.g., level, temperature, pressure, density, etc.) reaches close to critical values (e.g., the level reaching close to tank high/low limits, temperature getting close to tolerable limits), or when communications with one or more field devices fails. Although this Disclosure describes disclosed embodiments in terms of adaptively determined scan periods for process control, disclosed embodiments can alternatively be described in terms of adaptively determined scan rates for process control due to the simple inverse relation between the period (in units of time) and the rate (in units of 1/time).

Issues that individuals involved in the process such as operators, safety engineers, maintenance engineers, and service engineers face may include not being able to monitor the tanks very closely during tank loading/unloading which can result in overfill/underflow and safety issues, the scanning algorithms not being capable of adjusting the scanning based on actual flows in the tanks, rate of change of data, the data values being close to critical thresholds, or service actions. Moreover, when the shared communications device scans a non-communicating field device (i.e., a field device that experiences a communications errors such as timeout encountered when requests are sent to it), this reduces the scanning performance of the shared communications device due to the repeated retries as it tries to establish communications with that field device.

Disclosed embodiments recognize it is important to solve this scan rate problem because scanning of field devices typically utilizes serial field lines (e.g., RS-232, RS-485 or equivalent field lines) where the communications speed is slow (i.e., low baud rates) so that it is important to adaptively tune the time for scanning of the field devices to help obtain the important information on time. Disclosed embodiments however are not limited to serial field lines, and can also improve the overall scanning performance for Ethernet-based field communications as well. Moreover, known communication device scanning algorithms need improvement so that the available bandwidth can be more effectively utilized.

Disclosed embodiments include a method of process control within a plant comprising a first field device associated with first processing equipment for sensing a first process parameter and at least a second field device associated with second processing equipment for sensing a second process parameter. The first field device and second field device are both communicably coupled to a shared communications device including a computing device having an associated memory which implements an adaptive scan period determination algorithm stored in the memory (adaptive scanner). The adaptive scanner determines individual scan periods including a first scan period for the first field device based on at least a first parameter relevant to a data type of the first process parameter or a communications used by the first field device and a second scan period (not equal to the first scan period) for the second field device based on at least a second parameter relevant to a data type of the second process parameter or a communications used by the second field device. Operations in the plant are monitored by the host computer from sampled data provided by the shared communications device including data based on the first process parameter obtained from the first field device provided at the first scan period and the second process parameter obtained from the second field device provided at the second scan period.

DETAILED DESCRIPTION

Figure 1A:
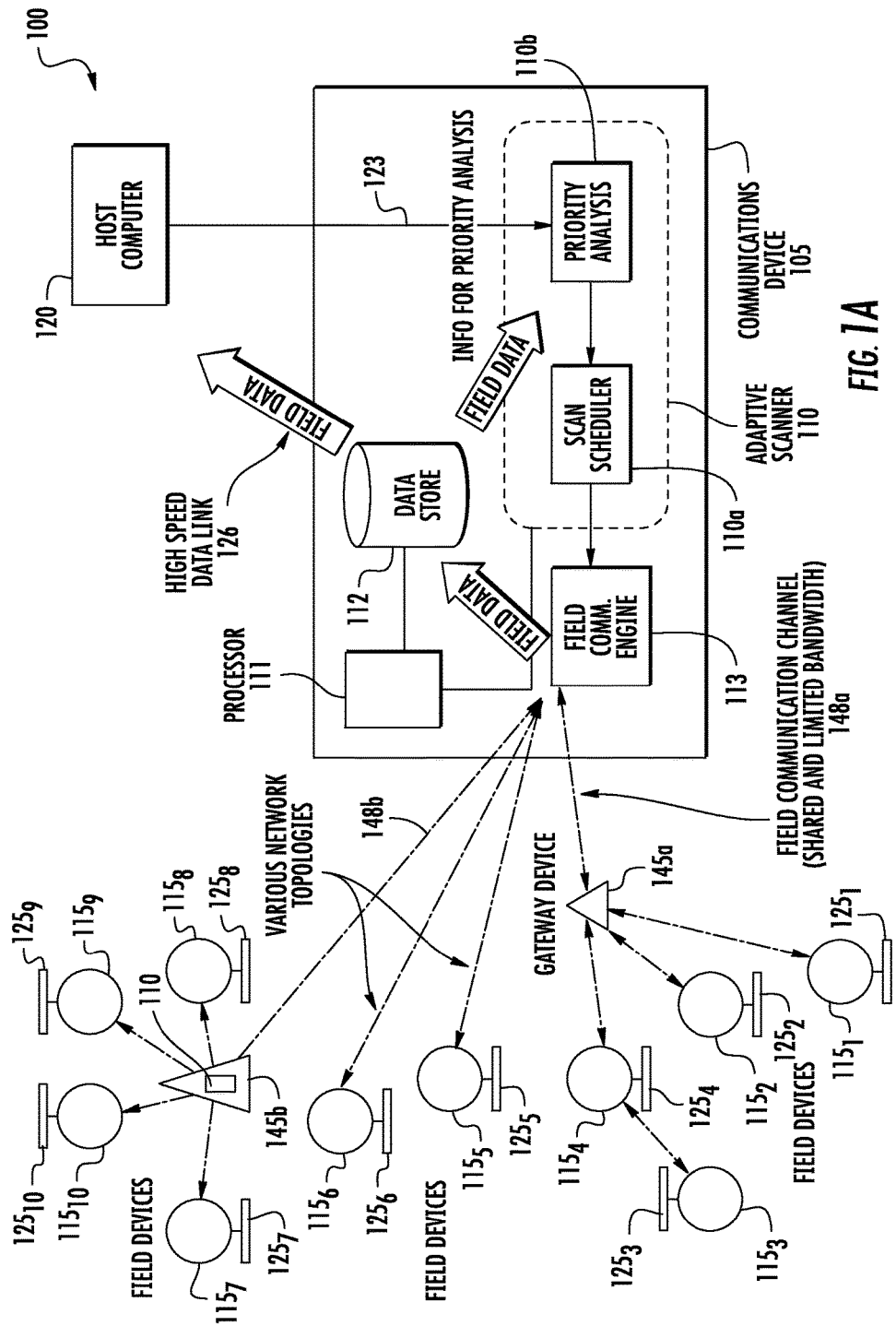
FIG. 1A is a block diagram depiction of an example self-adaptable communications system (system) including a disclosed communications device comprising an adaptive scanner, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1A is a block diagram depiction of a self-adaptable communications system (system) 100 including a disclosed communications device 105 comprising an adaptive scanner 110, where there are communications paths that include a gateway device 145a, 145b, according to an example embodiment. The positioning of a disclosed adaptive scanner generally depends upon the positioning of limited bandwidth in a shared communication channel. FIG. 1A reflects the adaptive scanner 110 within the communication device 105 and within one of the gateway devices 145b.

All communications disclosed herein generally shown by arrows can be wireless, wired (e.g., cable), or a combination or wireless and wired. The adaptive scanner 110 is configured for adaptively determining individual (custom) scan periods for a plurality of field devices $115_1$-$115_{10}$ (collectively 115) associated with processing equipment $125_1$-$125_{10}$ (collectively 125) in a plant based on at least one measured parameter relevant to a data type sensed by the respective field devices and/or other different considerations or data sources which can impact the scan rate/scan period. Although a single field device 115 is shown associated with each processing equipment 125, as known in the art there may be two or more field devices associated with any of the processing equipment 125 in the plant, such as level, temperature and pressure sensors on a particular piece of processing equipment (e.g., a boiler).

The adaptive scanner 110 is shown including a scan scheduler 110a, and a priority analysis block (PA block) 110b. The scheduled field requests are sent to the field devices over the field communications lines including shared field communications channel portion (shared communications channel) 148a, 148b using field communications engine block (Field communications block) 113. The host computer 120 provides information for the priority analysis comprising direct field communication requests and operational commands 123 (e.g., to set/increase focus on particular field data because of operational reasons, such as a tank level reaching a batch end) to the PA block 110b, from which the scan scheduler 110a determines a scan schedule (or queue). The scan scheduler 110a and a PA block 110b can be implemented by processor 111 running a disclosed adaptive scan period determination algorithm while the field communications block 113 typically comprising a transceiver is generally implemented using hardware. The adaptively determined scan schedule generated by the scan scheduler 110a is provided to the field communications block 113 which uses this information to determine when to "request" field data from the respective field devices 115 that is transmitted over a communications path including shared communications channels 148a, 148b that is shown between shared communications gateway devices (gateway devices) 145a and 145b and the communications device 105.

Field devices $115_1$-$115_4$ are shown communicably coupled to the communications device 105 through gateway device 145a while field devices $115_7$-$115_{10}$ are shown communicably coupled to the communications device 105 through gateway device 145b. Shared communication channels 148a, 148b each have limited channel bandwidth for the gateway devices 145a and 145b to communicate with the communications device 105, such as in the case of serial field lines (e.g., RS-232 or RS-4850) for the shared communications channel 148a, 148b.

As defined herein a gateway device 145a, 145b is a device that functions as a bridge between different communication media (for example between wireless and Ethernet) that enables multiple factory floor process controllers and devices to be connected to automation controllers, eliminating the need to program message instructions between controllers or other devices. Gateway device supports a plurality of different protocols for connectivity to hundreds or thousands of field devices 115 in the plant.

Gateway devices generally comprise functional blocks including communications interfaces suitable for the medium it communicates over, such as Ethernet, wireless, HART, serial or any proprietary communications link. This is for communications on both sides of the gateway device including basic electrical conversion, optionally a data buffer particularly when there are large differences in communication speed, one or more communication interfaces which are designed specifically to match the interfaces needs, and one or more scanners (dumb, or more or less intelligent), which collect data (i.e., the scanning functionality can be distributed or delegated to the gateways such as to scan sensors connected to a tank level gauge via a local bus on or near the tank) The "various network topologies" shown in FIG. 1A are shown to indicate a plurality of different communications configurations where bandwidth limitations can exist that can benefit from disclosed adaptive scanning. In such various network topologies data throughput is thus not limited to sensor clusters where the communication path is shared.

Bandwidth limitations/problems are generally a combination of maximum capacity and the amount of data which needs to be transmitted. Especially with newer "smart" field devices such as smart transmitters, the amount of information is increasing. Partly because the transmitters become multi-parameter, partly because there is an increasing desire to do more and more remotely and do more and more diagnostics, etc. and partly because the equipment integrates or interfaces to other sensors. Basically a typical tank sensor (or tank gauge) is doing essentially this. Thus, some equipment such as smart tank sensors act as if they have an internal gateway. Hence also multi-variable transmitter device which provides multiple variables with a direct non-shared communications link can experience data bandwidth issues when there is competition between the various variables that are scanned over the link that can thus benefit by utilizing disclosed adaptive scanning. In this embodiment the adaptive scanner can decide which variable of the multiple variables is the most important at a given moment and change the scan period in favor of that (to decrease its scan period).

The communications device 105 also includes a memory shown as a data store 112 which stores real-time obtained field data originating from the field devices 115 obtained via the field communications block 113. Field data from the data store 112 is provided to the host computer 120 over the high speed data link 126 shown which can be Ethernet or a serial link with a higher baud rate as compared to the shared communications channels 148a, 148b. Usually this is inside a control room with short distances where speeds are factors higher than on the field lines that may stretch over kilometers. As the high speed data link 126 in the overall communications link is typically not a bottle neck, disclosed adaptive scanning is generally not applied there.

Figure 1B:
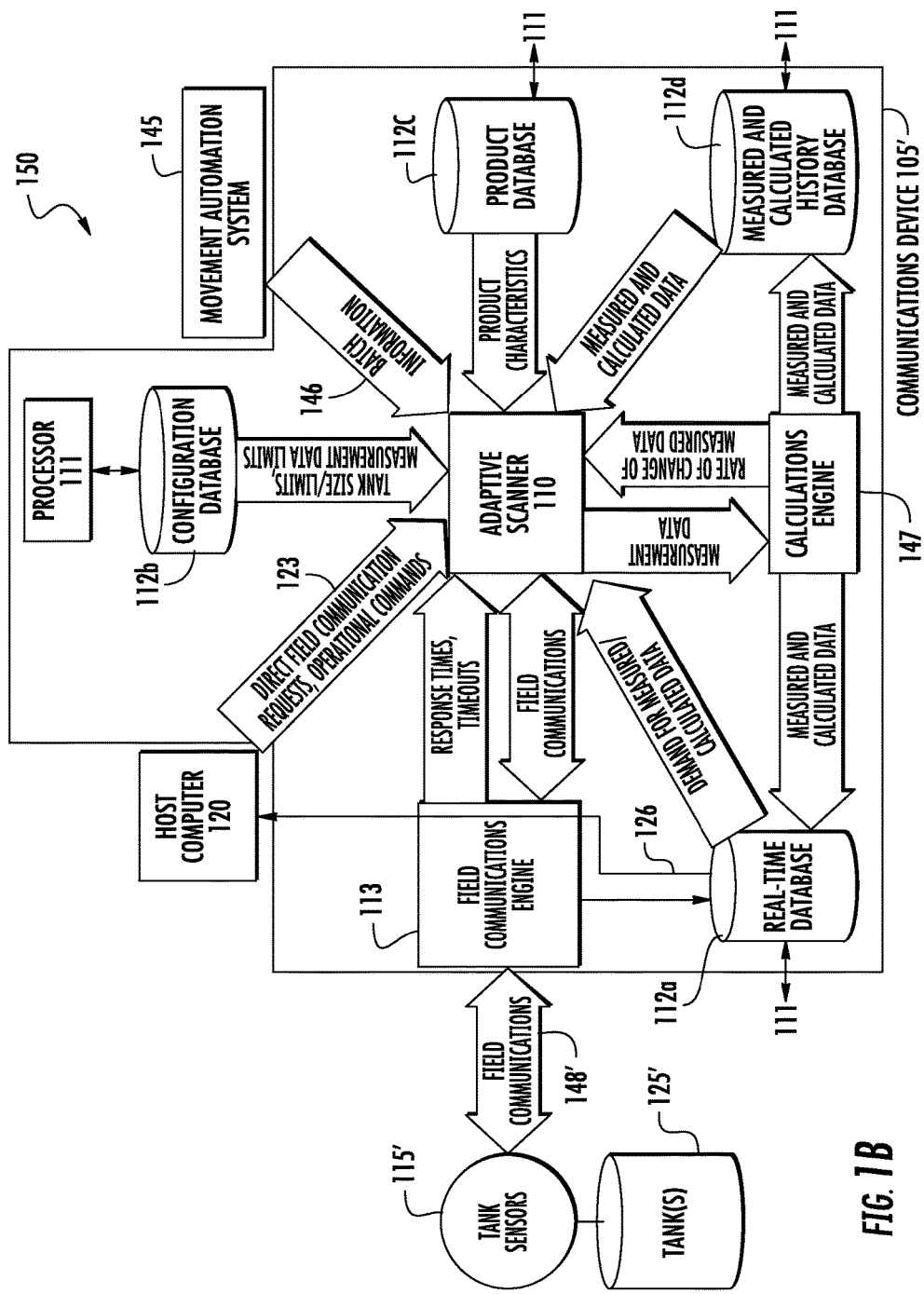
FIG. 1B is a block diagram depiction of an example self-adaptable communications system including a disclosed communications device containing an adaptive scanner for determining individual scan periods for tank sensors associated with tank(s) based on at least one measured parameter relevant to a data type sensed by the tank sensors and other different considerations or data sources which can impact the scan period that is determined, according to an example embodiment.

The adaptive scanner 110 initializes a default scan period for each field device, ranging from for example, 500 msecs to 5 seconds based on the information stored in a configuration database 112b in data store 112 as shown in FIG. 1B described below. The scan scheduler 110a maintains a scanning queue based on the order in which the field data items from the field devices 115 need to be scanned. The scan scheduler 110a populates the initial queue based on the configuration. During operation of system 100 the adaptive scanner 110 analyzes the field data it receives using the PA block 110b shown in FIG. 1A that is shown receiving field data from the data store 112 and information for priority analysis comprising direct field communication requests and operational commands 123 from the host computer 120, where information for priority analysis is a data path allowing the scan priority to be changed based on operational needs which cannot be determined from the data itself.

Once disclosed scanning is commenced, a disclosed adaptive scan period determination algorithm that implements scan scheduler 110a and PA block 110b decides the times at which each field data item from the field devices 115 is to be scanned next, considering events in the processing equipment 125 also, considered by the adaptive scan period determination algorithm, with generally non-equal weightages to the respective events. For example, some events monitored for tanks can include leak detection, an overfill/underflow event and movement detection if the tank level is moving up/down. Based on the relative importance accorded to each event, the field data item from the field devices 115 will move nearer (to sample more frequently) or farther (to sample less frequently) in the scanning queue.

FIG. 1B is a block diagram depiction of a self-adaptable communications system (system) 150 including a disclosed communications device 105' including an adaptive scanner 110 having a scan scheduler 110a and PA block 110b for determining individual scan periods for a plurality of field devices shown as tank sensors 115' associated with processing equipment shown as a tank 125' based on at least one measured parameter relevant to a data type sensed by the tank sensors 115' and other different considerations or data sources which can impact the scan period that is determined, according to an example embodiment. The tank sensors 115' are shown mounted on the top of the tank 125'. The communications path involving the communications device 105 does not include any gateway device such as the gateway devices 145a and 145b shown in FIG. 1A, with the shared communications channel 148' in system 150 shown being a direct link between tank sensors 115' and field communications engine 113. Although only 1 tank 125' is shown in FIG. 1B, there is generally a plurality of tanks in disclosed tank gauging systems such as shown in FIG. 1B.

The data store 112 shown in FIG. 1A is shown divided into databases including real-time database 112a, configuration database 112b, product database 112c and measured and calculated history database 112d. Host computer 120 and measurement automation system 145 are also shown providing information to the adaptive scanner 110 shown as direct field communication requests and operational commands 123 and batch information 146, respectively. The calculations engine block 147 performs calculations for the measurement data received from the adaptive scanner 110 and stores the information in real-time database 112a and in the measured and calculated history database 112d. The calculations engine 147 also provides the rate of change of measured data as an input to the adaptive scanner 110.

Although the adaptive scanner 110 is shown in FIGS. 1A and 1B as a localized scanner, the adaptive scanner 110 can be also be configured as a distributed adaptive scanner. In the case of a distributed adaptive scanner, the adaptive scanner can be extended to be positioned in a plurality of gateway devices as well as in the communications devices 105 and 105' as shown in FIGS. 1A and 1B. The adaptive scanners 110 in the respective gateway devices can generally work independently or collaboratively based on the actual scenario.

Figure 2:
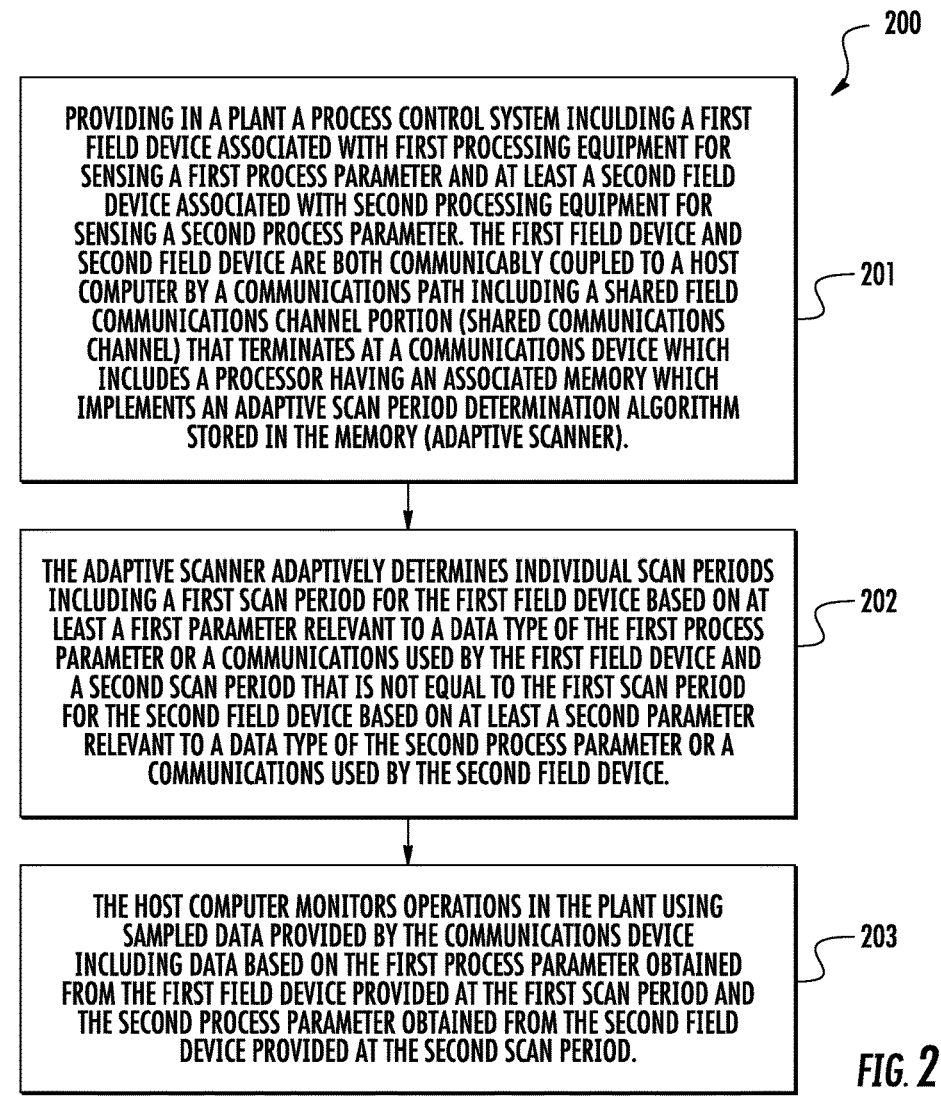
FIG. 2 is a flow chart that shows steps in an example method of process control within an industrial plant (plant) using field data provided at adaptably determined scan periods, according to an example embodiment.

FIG. 2 is a flow chart that shows steps in a method 200 of process control within an industrial plant (plant) using field data from a plurality of field devices provided to a host computer at adaptably determined scan periods, according to an example embodiment. Step 201 comprises providing in the plant a process control system including a first field device associated with first processing equipment for sensing a first process parameter and at least a second field device associated with second processing equipment for sensing a second process parameter, wherein the first field device and second field device are both communicably coupled to the host computer by a communications path including a shared field communications channel portion (shared communications channel) that terminates at a communications device which includes a processor having an associated memory which implements an adaptive scan period determination algorithm stored in the memory (adaptive scanner).

Step 202 comprises the adaptive scanner adaptively determining individual scan periods including a first scan period for the first field device based on at least a first parameter relevant to a data type of the first process parameter or a communications used by the first field device and a second scan period that is not equal to the first scan period for the second field device based on at least a second parameter relevant to a data type of the second process parameter or a communications used by the second field device. Step 203 comprises the host computer monitoring operations in the plant using sampled data provided by the communications device including data based on the first process parameter obtained from the first field device provided at the first scan period and the second process parameter obtained from the second field device provided at the second scan period.

The parameters that influence the adaptive scanner in the example scenario of tank gauging can include one or more of:

1) Flow or level parameters including a) distance from current tank level to the tank limits (high tank level, low tank level), b) distance from current tank level to a limit configured for programmable alarm (PAL) which can be based on a planned batch of loading/unloading, and c) moving flow status detection based on the actual level which can be used for leak detection.

2) Measurement data (e.g. level, temperature, pressure, density): including a) rate of change of data indicating how fast the data is changing, b) data values getting closer to critical/alarm values (e.g. temperature getting close to threshold limits), c) history of data changes (e.g., max change per time unit ever observed in a given tank, depending on tank and installation dimensioning or product characteristics), and d) measurement data characteristics such as the temperature of a small volume changes faster than that of a large volume, and temperature of some product compositions change faster than others, temperature of a tank that is filling is more likely to change than one that is emptying.

3) Communication parameters including a) adjust timeouts for receiving responses based on time taken by the field device to respond for requests. Retries in case of communication failures can be set to 0 after initial configured retries which ensures that other scans are not affected.

4) Requirements of different consumers including a) manual processes that need fast service for example, service engineers servicing field devices through communication device; b) Requests by various host devices (e.g. Modbus, OPC clients) to get data from devices to adapt the supply based on the demand.

5) Set default scanning frequency based on the prior knowledge/behavior of tanks including a) Temperature and density change very slowly in tanks, hence scanning frequency for these parameters are set to a lesser value compared to level, and b) measurement data changes slowly in tanks with larger diameter. Hence for tanks with larger diameter, the scanning frequency can be set to lesser value compared to tanks with smaller diameter.

A significant disclosed feature is adapting the scanning algorithm within the communication device 105, 105' automatically based on the detected scenario and using a set of parameters unique to scanning. Scanning is thus made intelligent based on live scenario in the processing equipment and using input parameters such as thresholds and batch limits, which avoids/reduces manual actions. A mechanism for tank applications is provided to detect leaks and hence enhances safety, where due to faster (more frequent) level measurements, leaks can be detected more rapidly. Leak detection is also possible since disclosed adaptive scan algorithms take into account whether any planned batch activities or maintenance activities are happening on the tank. If no such planned activities are in progress, but still a flow is detected, then this can be used to indicate a leak.

Scanning can be self-learning based on timeouts that happen on the line, response times of field devices such as tank sensors, tank filling/unfilling, etc. Operators and others can obtain the needed information from the field devices faster which enables taking more timely appropriate actions. The supply of scanning information can be based on demand for the data, hence this ensures information is scanned only when required. Sufficient bandwidth is provided for service actions without impacting the regular scanning. Operators and others can obtain measurements from other field devices on the field line faster even when some field device(s) are in failure.

Disclosed adaptive scanning can generally benefit systems where sensor data is scanned and collected over low bandwidth channels. Other example applications for disclosed embodiments including for trains, cars and building automation.

EXAMPLES

Disclosed embodiments are further illustrated by the following specific Examples, which should not be construed as limiting the scope or content of this Disclosure in any way.

An example disclosed method of process control using a dynamically adaptable scanner operates as follows for field data comprising flow or level parameters obtained from field devices comprising tank sensors. Each tank sensor provided item (e.g. product level) to be scanned by the communications device is configured with a desired/default scan frequency, such as in seconds. A scan scheduler 110a maintains a (scanning) queue based on the order in which the items need to be scanned. The scan scheduler 110a populates the initial queue in field communications block 113 based on the scan frequency configuration.

Once scanning is commenced, a disclosed adaptive scan period determination algorithm using PA block 110b which receives information for priority analysis comprising direct field communication requests and operational commands 123 from the host computer 120 and field data information from the data store 112 decides the times at which each item is to be scanned next, considering any events in the associated tank, with generally non-equal weightings to the respective events. Some events monitored in the tank are listed below in their typical order of importance.

Leak detection (i.e., if the tank level is moving without a batch or movement order), an overfill/underflow event (i.e., the tank level is close to a High/Low Tank level), batch completion detection (i.e., the tank level is close to the planned loading/unloading batch limits configured for programmable alarm, and movement detection if the tank level is moving up/down. Based on the relative importance accorded to the event, the respective item will move nearer or farther in the scanning queue. For example, if an overfill/underflow condition is detected, then it is moved nearer in the scanning queue compared to when only a general tank level movement condition is detected.

Figure 3:
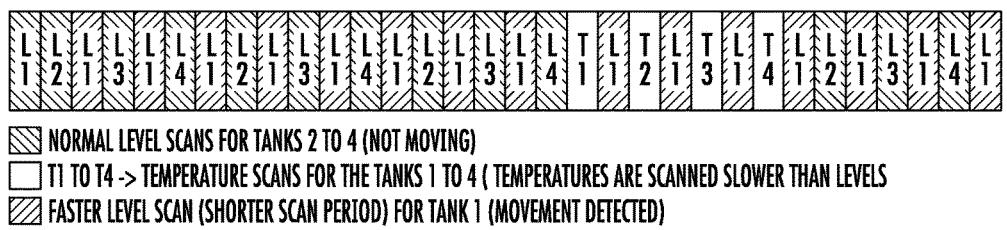
FIG. 3 is diagram that illustrates a scenario where movement is detected in tank 1 of a tank farm having 4 tanks, and adaptably determined scan periods resulting in a shorter scan period (higher scan rate) for level measurements from tank 1 compared to level measurements for the other tanks, according to an example embodiment.

FIG. 3 is diagram 300 that illustrates a scenario where level movement is detected in tank 1 (but not in tanks 2 to 4) of a tank farm having 4 tanks, and adaptably determined scan periods are determined and used for tank gauging resulting in a shorter scan period for level measurements from tank 1 compared to the other tanks, according to an example embodiment. Tank 1 is prioritized in the scan queue (shorter scan period) for level measurements to be sampled every 2 time slots despite there being 4 tanks being sampled. Tanks 2 to 4 are shown having normal level scans (the standard level scan period), >the faster level scan period) for level measurements. All tanks are shown with temperature sampling being at the same scan period, which is at a longer scan period compared to the standard level scan period.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method of process control within an industrial plant (plant), comprising:
   providing in said plant a process control system including a first field device associated with first processing equipment for sensing a first process parameter and at least a second field device associated with second processing equipment for sensing a second process parameter, wherein said first field device and said second field device are both communicably coupled to a host computer by a communications path including a shared field communications channel portion (shared communications channel) that terminates at a communications device which includes a processor having an associated memory which implements an adaptive scan period determination algorithm stored in said memory (adaptive scanner);
   said adaptive scanner adaptively determining individual scan periods including a first scan period for said first field device and a second scan period that is not equal to said first scan period for said second field device, wherein said first scan period is determined using field data values received from said first field device including a first process parameter, field communication requests and operational commands from said host computer, and wherein said second scan period is determined using field data values received from said second field device including a second process parameter, and said field communication requests and said operational commands from said host computer, and
   said host computer monitoring operations in said plant using sampled data provided by said communications device including data based on said first process parameter provided at said first scan period and said second process parameter provided at said second scan period.

2. The method of claim 1, further comprising at least one gateway device, wherein said adaptive scanner is part of said gateway device.

3. The method of claim 2, wherein there are a plurality of said gateway devices in a distributed configuration each including said adaptive scanner.

4. The method of claim 1, further comprising at least one gateway device, wherein said communications device is a stand-alone device and is between said gateway device and said host computer, and wherein said shared communications channel is between said gateway device and said communications device.

5. The method of claim 1, wherein said first process parameter and said second process parameter both include a flow parameter or measurement data.

6. The method of claim 1, wherein said first process parameter and said second process parameter both include a communication parameter.

7. The method of claim 1, wherein said first and said second processing equipment comprise storage tanks.

8. The method of claim 1, wherein said shared communications channel comprises a serial field line.

9. The method of claim 1, wherein said shared communications channel supports a plurality of different variables.

10. A software product, comprising:
    a non-transitory data storage medium (memory) that includes program instructions for an adaptive scan period determination algorithm (adaptive scanner) stored in said memory executable by a processor to enable said processor to execute a method of process control within an industrial plant (plant) including a first field device associated with first processing equipment for sensing a first process parameter and at least a second field device associated with second processing equipment for sensing a second process parameter, wherein said first field device and said second field device are both communicably coupled to a host computer by a shared communications channel that terminates at a communications device which includes said processor and said memory as associated memory that implements said adaptive scanner, said method comprising:
    adaptively determining individual scan periods including a first scan period for said first field device and a second scan period that is not equal to said first scan period for said second field device, wherein said first scan period is determined using field data values received from said first field device including a first process parameter, field communication requests, and operational commands from said host computer, and wherein said second scan period is determined using field data values received from said second field device including a second process parameter, said field communication requests, and said operational commands from said host computer.

11. The software product of claim 10, comprising wherein said first process parameter and said second process parameter both include a flow parameter or measurement data.

12. The software product of claim 10, wherein said first process parameter and said second process parameter both include a communication parameter.

13. The software product of claim 10, wherein said first and said second processing equipment comprise storage tanks.

14. The software product of claim 10, wherein said shared communications channel comprises a serial field line.

* * * * *